(12) United States Patent
Han et al.

(10) Patent No.: US 12,603,307 B2
(45) Date of Patent: Apr. 14, 2026

(54) APPARATUS AND METHOD FOR CORRECTING OFFSET OF PRESSURE SENSOR IN FUEL CELL SYSTEM

(71) Applicants: Hyundai Motor Company, Seoul (KR); Kia Corporation, Seoul (KR)

(72) Inventors: Sang Wook Han, Seoul (KR); Jae Won Jung, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 841 days.

(21) Appl. No.: 17/861,473

(22) Filed: Jul. 11, 2022

(65) Prior Publication Data

US 2023/0021688 A1 Jan. 26, 2023

(30) Foreign Application Priority Data

Jul. 20, 2021 (KR) ........................ 10-2021-0095017

(51) Int. Cl.
H01M 8/0438 (2016.01)
G01L 25/00 (2006.01)
H01M 8/04664 (2016.01)

(52) U.S. Cl.
CPC ......... H01M 8/04388 (2013.01); G01L 25/00 (2013.01); H01M 8/04686 (2013.01)

(58) Field of Classification Search
CPC ......... H01M 8/04388; H01M 8/04686; H01M 8/0438; H01M 2250/20; H01M 8/04753; G01L 25/00; G01L 27/002; Y02E 60/50
See application file for complete search history.

(56) References Cited

U.S. PATENT DOCUMENTS

2018/0292284 A1* 10/2018 Kim .................. H01M 8/04388

FOREIGN PATENT DOCUMENTS

KR 10-2018-0114585 A 10/2018

* cited by examiner

*Primary Examiner* — Ula C Ruddock
*Assistant Examiner* — Sarika Gupta
(74) *Attorney, Agent, or Firm* — Morgan, Lewis & Bockius LLP

(57) ABSTRACT

Introduced are an apparatus for correcting an offset of a pressure sensor in a fuel cell system including a first pressure sensor and a second pressure sensor, which are installed between a rear end of a fuel supply valve of a hydrogen supply system and an anode inlet, and a method of correcting an offset using the same. The apparatus includes an offset corrector that calculates offsets between the sensors from a condition of same pressure of each of the sensors and corrects offsets with respect to the first pressure sensor and the second pressure sensor using the calculated offsets.

16 Claims, 6 Drawing Sheets

APPARATUS AND METHOD FOR CORRECTING OFFSET OF PRESSURE SENSOR IN FUEL CELL SYSTEM

CROSS REFERENCE TO RELATED APPLICATION

The present application claims the benefit of priority to Korean Patent Application No. 10-2021-0095017, filed on Jul. 20, 2021 in the Korean Intellectual Property Office, the entire contents of which is incorporated herein by reference.

TECHNICAL FIELD

The present disclosure relates to a technology for correcting an offset of a pressure sensor in a fuel cell system, and more particularly, to an apparatus and method for correcting an offset of a pressure sensor in a fuel cell system, which are capable of correcting a difference between a measurement value and an actual pressure in the pressure sensor used in the fuel cell system.

BACKGROUND

Fuel cells are energy conversion devices that convert chemical energy of fuel into electrical energy by an electrochemical reaction without making conversion into heat by combustion, and may be used not only to supply power for industrial, home, and vehicle, but also to supply power to small electric/electronic products and portable devices.

In particular, a membrane-electrode assembly (MEA), which is a main component, is located in the innermost of a polymer electrolyte membrane fuel cell (PEMFC) having a high power density, and the MEA includes a solid polymer electrolyte membrane capable of moving hydrogen ions, and a cathode and an anode, which are electrode layers coated with a catalyst so that hydrogen and oxygen may react on both surfaces of the electrolyte membrane.

In a hydrogen supply system, high-pressure hydrogen supplied from a hydrogen tank is reduced to a certain pressure and then supplied to a fuel cell stack, and at this time, the depressurized hydrogen is supplied to the fuel cell stack in a state a supply amount is controlled through pressure control according to operating conditions of the fuel cell stack. Also, residual hydrogen after the reaction in the fuel cell stack is recycled to an anode by a hydrogen recirculation apparatus.

Valves are installed to cut off hydrogen supply in a hydrogen supply system of a fuel cell system of the related art, and pressure sensors for measuring the pressure in the hydrogen supply system are installed in the vicinity of these valves.

In current fuel cell systems, a fuel cell system is controlled using measurement values of these pressure sensors, and the accuracy of the measurement values of these pressure sensors has a great influence on the system fuel efficiency and durability.

Meanwhile, the pressure sensors gradually generates offsets according to the operation of the fuel cell system, and it is required to ensure the accuracy of the measurement values of the pressure sensors by correcting the offsets. Also, in a case of using a gauge pressure sensor that is not capable of measuring a pressure less than atmospheric pressure, there has been a problem that offset correction is impossible because a negative (−) offset may not be corrected with the method of the related art.

The information disclosed in the Background section above is to aid in the understanding of the background of the present disclosure, and should not be taken as acknowledgement that this information forms any part of prior art.

SUMMARY

The present disclosure is proposed to solve these problems and aims to provide an apparatus and method for correcting an offset of a pressure sensor in a fuel cell system, which are capable of improving the accuracy of a measurement value of the pressure sensor by correcting the offset with respect to the pressure sensor of a hydrogen supply system of the fuel cell system.

In particular, the present disclosure aims to allow even nozzle pressure sensors configured to be unable to measure a pressure less than atmospheric pressure and even nozzle pressure sensors capable of only measuring a pressure greater than the atmospheric pressure like gauge pressure sensor to be capable of correcting an offset by calculating each of a negative (−) offset and a positive (+) offset and summing and correcting them.

A method of correcting an offset of a pressure sensor in a fuel cell system including a first pressure sensor and a second pressure sensor, which are installed between a rear end of a fuel supply valve of a hydrogen supply system and an anode inlet, according to one aspect of the present disclosure for achieving the above described objective may include: determining whether pressure at a position of the first pressure sensor and pressure at a position of the second pressure sensor are equal to each other in a closed state of the fuel supply valve; when determined to be an equal pressure to each other, calculating a first offset from a difference between a detected pressure value of the first pressure sensor and a detected pressure value of the second pressure sensor; determining whether the pressure at the position of the second pressure sensor is equal to atmospheric pressure by opening a fuel exhaust valve; when determined that the pressure at the position of the second pressure sensor is equal to the atmospheric pressure, calculating a second offset from a difference between a detected pressure value of an atmospheric pressure sensor and a detected pressure value of the second pressure sensor in a state in which the fuel exhaust valve is closed; and correcting offsets of the first pressure sensor and the second pressure sensor using the first offset and the second offset.

In the correcting offsets of the first pressure sensor and the second pressure sensor, an offset with respect to the first pressure sensor may be determined as a sum of the first offset and the second offset, and an offset with respect to the second pressure sensor may be determined as the second offset.

In the determining whether pressure at a position of the first pressure sensor and pressure at a position of the second pressure sensor are equal to each other in a closed state of the fuel supply valve, when a preset first reference period of time has elapsed, or when a variance in the detected pressure value of the first pressure sensor and a variance in the detected pressure value of the second pressure sensor each are maintained to be less than a preset threshold variance for a second reference period of time, it may be determined that the pressure at the position of the first pressure sensor and the pressure at the position of the second pressure sensor are equal to each other.

In the determining of whether the pressure at the position of the second pressure sensor is equal to atmospheric pressure by opening a fuel exhaust valve, when an amount of gas emission from the hydrogen supply system reaches a preset reference value, or when a variance in the detected pressure value of the atmospheric pressure sensor and a variance in the detected pressure value of the second pressure sensor each are maintained to be less than a preset threshold variance for a second reference period of time, it may be determined that the pressure at the position of the second pressure sensor and the atmospheric pressure are equal to each other.

Prior to the determining whether pressure at a position of the first pressure sensor and pressure at a position of the second pressure sensor are equal to each other in a closed state of the fuel supply valve, the method may further include checking, by the offset corrector, whether the first sensor correction cycle (T1) or the second sensor correction cycle (T2) is reached.

When the first sensor correction cycle (T1) is reached, an offset of the first pressure sensor may be corrected by a sum of the first offset and the second offset calculated by performing operations performed after the determining whether pressure at a position of the first pressure sensor and pressure at a position of the second pressure sensor are equal to each other in a closed state of the fuel supply valve.

When the second sensor correction cycle (T2) is reached, the calculating a first offset is skipped and only operations performed after the determining whether the pressure at the position of the second pressure sensor is equal to atmospheric pressure by opening a fuel exhaust valve are performed, an offset of the second pressure sensor may be corrected by the calculated second offset.

According to another aspect of the present disclosure, an apparatus for correcting an offset of a pressure sensor in a fuel cell system including a first pressure sensor and a second pressure sensor, which are installed between a rear end of a fuel supply valve of a hydrogen supply system and an anode inlet, may include an offset corrector for correcting an offset with respect to the first pressure sensor and an offset with respect to the second pressure sensor.

When pressure at a position of the first pressure sensor and pressure at a position of the second pressure sensor are equal to each other in a closed state of the fuel supply valve, the offset corrector may calculate a first offset from a difference between a detected pressure value of the first pressure sensor and a detected pressure value of the second pressure sensor, and when pressure at the position of the second pressure sensor is equal to atmospheric pressure by opening a fuel exhaust valve connected on an exhaust side, the offset corrector may calculate a second offset from a difference between a detected pressure value of an atmospheric pressure sensor and a detected pressure value of the second pressure sensor in a state in which the fuel exhaust valve is closed. The offset corrector may correct offsets of the first pressure sensor and the second pressure sensor using the calculated first and second offsets.

The offset corrector may determine a sum of the first offset and the second offset as an offset with respect to the first pressure sensor, and determine the second offset as an offset with respect to the second pressure sensor.

The offset corrector stores information on a first sensor correction cycle (T1) for the first pressure sensor and a second sensor correction cycle (T2) for the second pressure sensor, and the offset corrector checks whether the first sensor correction cycle (T1) or the second sensor correction cycle (T2) is reached. When the first sensor correction cycle (T1) is reached, the offset corrector may correct the offset of the first pressure sensor by the calculated sum of the first offset and the second offset, and when the second sensor correction cycle (T2) is reached, the offset corrector may correct the offset of the second pressure sensor by the calculated second offset.

The first pressure sensor may be a gauge pressure sensor and the second pressure sensor may be an absolute pressure sensor, and particularly, the first pressure sensor may be a nozzle pressure sensor located between the fuel supply valve and an ejector and the second pressure sensor may be an anode pressure sensor located between a rear end of the ejector and the anode inlet.

According to an apparatus and method for correcting an offset of a pressure sensor in a fuel cell system of the present disclosure, by setting same pressure conditions between pressure sensors in consideration of a change in pressure conditions due to opening and closing of a valve in a fuel cell system, there is an advantage in that an offset value can be accurately calculated only from a difference between measurement values between the pressure sensors. Therefore, according to an apparatus and method for correcting an offset of a pressure sensor in a fuel cell system of the present disclosure, even without adding additional hardware, there is an effect that an offset of a pressure sensor of a hydrogen supply system can be easily corrected.

Also, according to various aspects of the present disclosure, even when a nozzle pressure sensor includes a sensor capable of only measuring a pressure greater than or equal to atmospheric pressure, an offset of the nozzle pressure sensor can be corrected by calculating each of a negative (−) offset and a positive (+) offset and summing and correcting them.

Also, according to various aspects of the present disclosure, because offsets of a nozzle pressure sensor and an anode pressure sensor of a hydrogen supply system can be accurately corrected, the accuracy of measurement values of each sensor is improved, thereby improving stack durability of a fuel cell system and improving fuel efficiency.

DETAILED DESCRIPTION

Hereinafter, an apparatus and method for correcting an offset of a pressure sensor in a fuel cell system according to various embodiments of the present disclosure will be described in detail with reference to the accompanying drawings.

Figure 1:
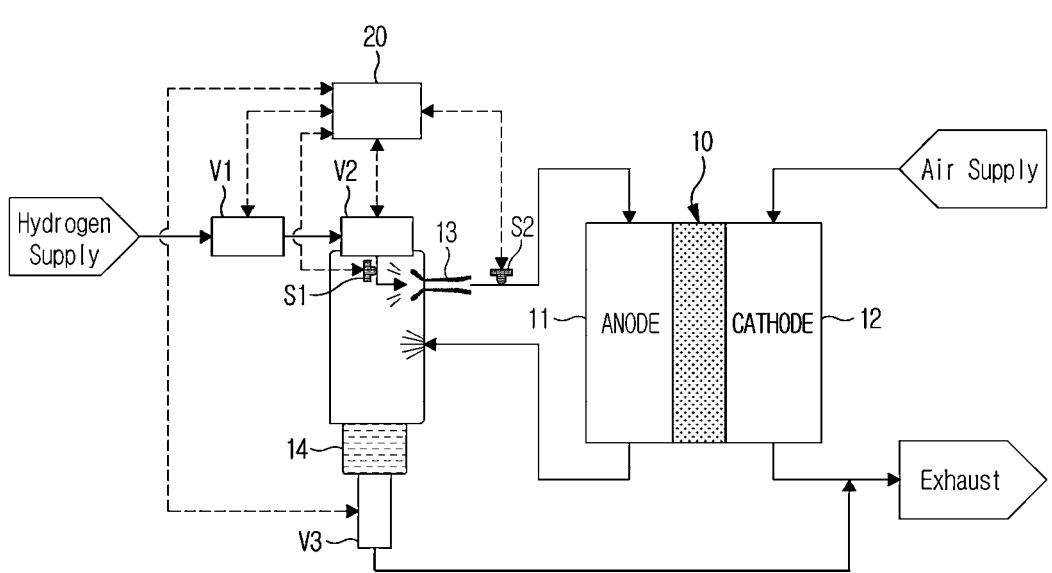
FIG. 1 is a block diagram of a fuel cell system to which an apparatus for correcting an offset of a pressure sensor is applied, according to an exemplary embodiment of the present disclosure.
Figure 2:
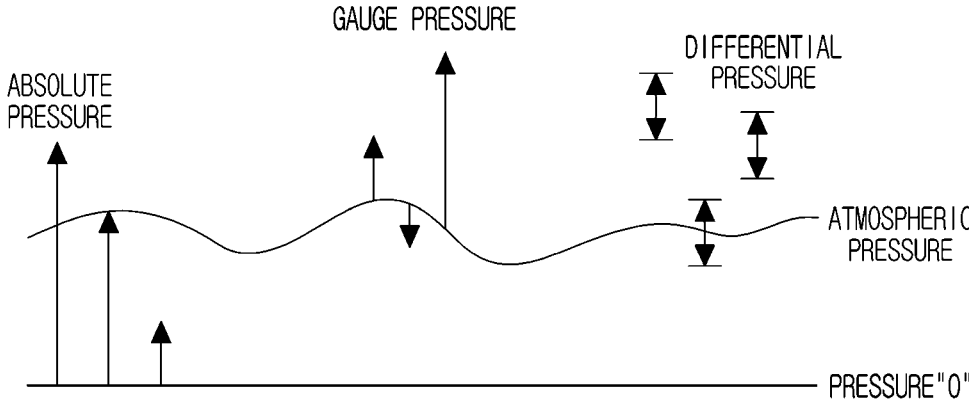
FIG. 2 is a graph conceptually illustrating a pressure measurement range according to a type of a pressure sensor.

FIG. 1 is a block diagram of a fuel cell system to which an apparatus for correcting an offset of a pressure sensor is applied, according to an embodiment of the present disclosure, and FIG. 2 shows a graph conceptually illustrating a pressure measurement range according to a type of a pressure sensor.

Referring to FIG. 1, a hydrogen supply system for supplying hydrogen is connected to an anode 11 of a fuel cell stack 10, and an air supply system for supplying air is connected to a cathode 12.

The air supply system absorbs, compresses and humidifies, and then supplies external air to the cathode 12, and at this time, air passing through the cathode 12 reacts with hydrogen on the anode 11 side to generate electrical power.

In the hydrogen supply system, a hydrogen supply source (a pressure vessel storing hydrogen) is installed, and an ejector for jetting air supplied from the hydrogen supply source on the anode 11 side is installed. Also, in the hydrogen supply system, a fuel cut-off valve V1 may be installed so that fuel supplied from the hydrogen supply source on the ejector side may be cut off, and at the rear end thereof, a fuel supply valve V2 for adjusting a hydrogen pressure supplied to the fuel cell stack 10 may be installed. The fuel supply valve V2 may be configured to depressurize high-pressure gas stored in the pressure vessel to a certain pressure. Therefore, hydrogen supplied from the hydrogen supply source is supplied on the anode 11 side through the ejector when the fuel cut-off valve V1 and the fuel supply valve V2 are opened.

Among the hydrogen supplied to the anode 11, some hydrogen not participating in the reaction may be recycled to the front end of the anode 11 and supplied to the anode 11 again. At this time, condensed water in the anode 11 is discharged together with some hydrogen not participating in the reaction, and a water trap 14 for collecting the condensed water is installed on an outlet side of the anode 11.

A water level detection sensor for detecting a water level in a water trap is installed in the water trap 14, and when it is confirmed that a water level of condensed water is greater than or equal to a threshold via the water level detection sensor, the condensed water may be discharged to the outside through a fuel exhaust valve V3 at the bottom of the water trap 14. In this case, gases such as hydrogen from the outlet of the anode 11 as well as condensed water may be emitted through the fuel exhaust valve V3.

Meanwhile, pressure sensors for detecting pressure may be installed at front and rear ends of the ejector. Specifically, as shown in FIG. 1, a nozzle pressure sensor as a first pressure sensor S1 may be installed between the fuel supply valve V2 and the ejector, and an anode pressure sensor as a second pressure sensor S2 may be installed at the rear end of the ejector and a forward end of an inlet of the anode 11.

The nozzle pressure sensor may be used to estimate an amount of off-gas emitted to the fuel exhaust valve V3, that is, an amount of gas emission from the anode 11, and accordingly, may be utilized to calculate a concentration of hydrogen in the anode 11 and determine a closing time point of the fuel exhaust valve V3. Also, the anode pressure sensor may be utilized to determine a hydrogen supply amount via proportional integral (PI) control of pressure.

Also, the nozzle pressure sensor may include a gauge pressure sensor capable of only measuring a positive (+) pressure based on atmospheric pressure, and the anode pressure sensor may include an absolute pressure sensor capable of measuring a pressure less than the atmospheric pressure.

In this regard, FIG. 2 shows a measurable range according to a type of a pressure sensor. As shown in FIG. 2, The nozzle pressure sensor includes the gauge pressure sensor, and thus, may not measure a pressure less than atmospheric pressure, and the anode pressure sensor includes the absolute pressure sensor, and thus, may measure the full range of pressure including positive (+) and negative (−) pressures based on the atmospheric pressure.

Even in a case where an apparatus for correcting an offset of a pressure sensor in a fuel cell system according to an exemplary embodiment of the present disclosure includes both types of sensors, the apparatus may be configured to enable offset correction of a pressure sensor by an offset corrector 20.

Figure 3:
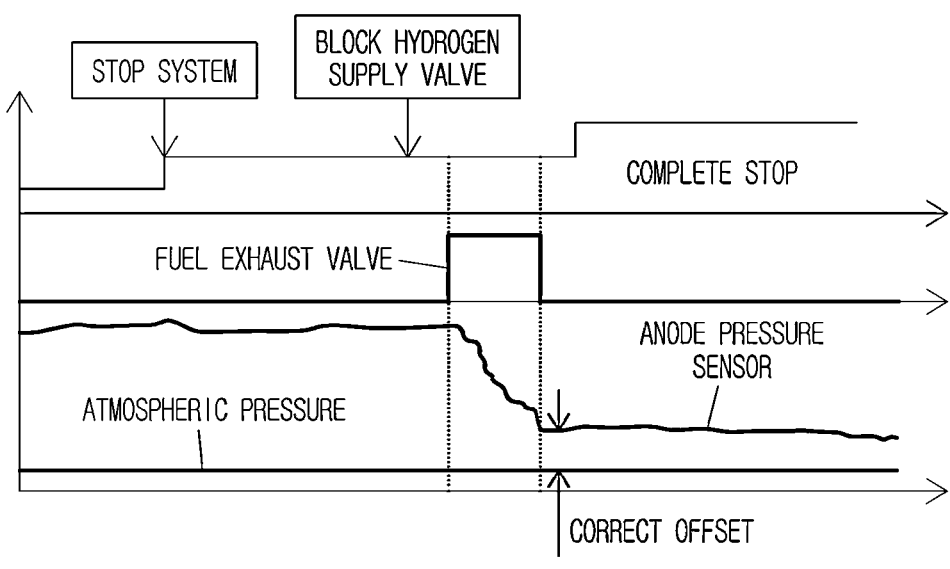
FIG. 3 is a graph illustrating an offset correction process of an anode pressure sensor.

In this regard, in FIG. 3, introduced is a method of correcting an offset of the anode pressure sensor from a difference between measurement values of an atmospheric pressure sensor and the anode pressure sensor, that is, an actually measured pressure value. That is, as shown in FIG. 3, in a state where a fuel cell system is stopped and a hydrogen supply valve (fuel supply valve) is blocked, when the fuel exhaust valve V3 is opened, the anode 11 side is exhausted and comes to atmospheric pressure. Therefore, a measurement value of the anode pressure sensor gradually decreases to near atmospheric pressure.

At this time, when a time point at which pressure of the hydrogen supply system, that is, pressure at the position of the anode pressure sensor, is equal to atmospheric pressure is specified, a difference between a measurement value of the atmospheric pressure sensor and a measurement value of the anode pressure sensor at the corresponding time point eventually becomes an offset of the anode pressure sensor. Therefore, offset correction may be performed by applying a value of the calculated offset to the anode pressure sensor.

However, in this method of offset correction, it is difficult to apply an offset correction method of the anode pressure sensor as it is because negative (−) offset correction is impossible in the case of the nozzle pressure sensor not capable of measuring a pressure less than atmospheric pressure.

Meanwhile, in the present disclosure, the offset corrector 20 for correcting pressure sensors in the hydrogen supply system is included, and the offset corrector 20 may calculate a first offset according to a difference between measurement values of the nozzle pressure sensor and the anode pressure sensor and a second offset according to a difference between measurement values of the atmospheric pressure sensor and the anode pressure sensor, and may correct offsets of the nozzle pressure sensor and the anode pressure sensor based on the first offset and the second offset.

As shown in FIG. 1, the offset corrector 20 is connected to the first pressure sensor S1 and the second pressure sensor S2, may receive measurement values of each pressure sensor, and is configured to perform offset correction on each pressure sensor. Also, the offset corrector 20 is connected to the fuel cut-off valve V1, the fuel supply valve V2, and the fuel exhaust valve V3, and is configured to receive information on an open/close state of each valve. Also, the offset corrector 20 may be configured as part of a controller for controlling each component in the fuel cell system, and may be configured to perform opening/closing control of each valve by replacing the controller by limiting system stop and offset correction control.

The controller of the fuel cell system according to an exemplary embodiment of the present disclosure may be a processor (e.g., computer, microprocessor, CPU, ASIC, circuitry, logic circuits, etc.). The controller may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

Hereinafter, in describing the offset corrector 20 in the present disclosure, the nozzle pressure sensor will be described as the first pressure sensor S1, and the anode pressure sensor will be described as the second pressure sensor S2.

The offset corrector 20 may be configured to, when whether pressure at the position of the first pressure sensor S1 and pressure at the position of the second pressure sensor S2 are equal to each other in a closed state of the fuel supply valve V2 is determined and it is determined to be the same pressure, calculate a first offset from a difference between a detected pressure value of the first pressure sensor S1 and a detected pressure value of the second pressure sensor S2.

In this regard, because an actual pressure at the position of the first pressure sensor S1 and an actual pressure at the position of the second pressure sensor S2 are equal to each other, a difference between a measurement value of the first pressure sensor S1 and a measurement value of the second pressure sensor S2 refers to an offset between the two sensors.

Similarly, when the second pressure sensor S2 and the atmospheric pressure sensor are brought into the same pressure state through valve control and then a difference between measurement values of the second pressure sensor S2 and the atmospheric pressure sensor is detected, the difference between the corresponding measurement values refers to an offset between the second pressure sensor S2 and the atmospheric pressure sensor.

Therefore, in detecting the offset between the second pressure sensor S2 and the atmospheric pressure sensor, the following offset determination method may be applied.

That is, whether pressure at the position of the second pressure sensor S2 is equal to atmospheric pressure may be determined by opening the fuel exhaust valve V3 connected to an exhaust side while the fuel supply valve V2 is closed. At this time, when the pressure at the position of the second pressure sensor S2 is equal to the atmospheric pressure, a second offset may be calculated from a difference between a detected pressure value of the atmospheric pressure sensor and a detected pressure value of the second pressure sensor S2 while the fuel exhaust valve V3 is closed.

At this time, an offset with respect to the first pressure sensor S1 is determined as the sum of the first offset and the second offset, and an offset with respect to the second pressure sensor S2 is determined as the second offset.

Meanwhile, the offset corrector 20 may store information on a first sensor correction cycle (T1) for the first pressure sensor S1 and a second sensor correction cycle (T2) for the second pressure sensor S2. Therefore, the offset corrector 20 may check whether the stored first sensor correction cycle (T1) or second sensor correction cycle (T2) is reached, and may selectively perform correction on each pressure sensor.

For example, when the first sensor correction cycle (T1) is reached, the offset corrector 20 may correct an offset of the first pressure sensor S1 by summing the calculated first and second offsets. In contrast, when the second sensor correction cycle (T2) is reached, the offset corrector 20 may correct an offset of the second pressure sensor S2 by the calculated second offset.

A method of correcting an offset of a pressure sensor in a fuel cell system according to an exemplary embodiment of the present disclosure, which may be performed using an apparatus for correcting an offset of a pressure sensor in a fuel cell system as described above is described in FIG. 4. In particular, FIG. 4 is a flowchart conceptually showing each operation of a method of correcting an offset of a pressure sensor, according to the present disclosure.

Figure 4:
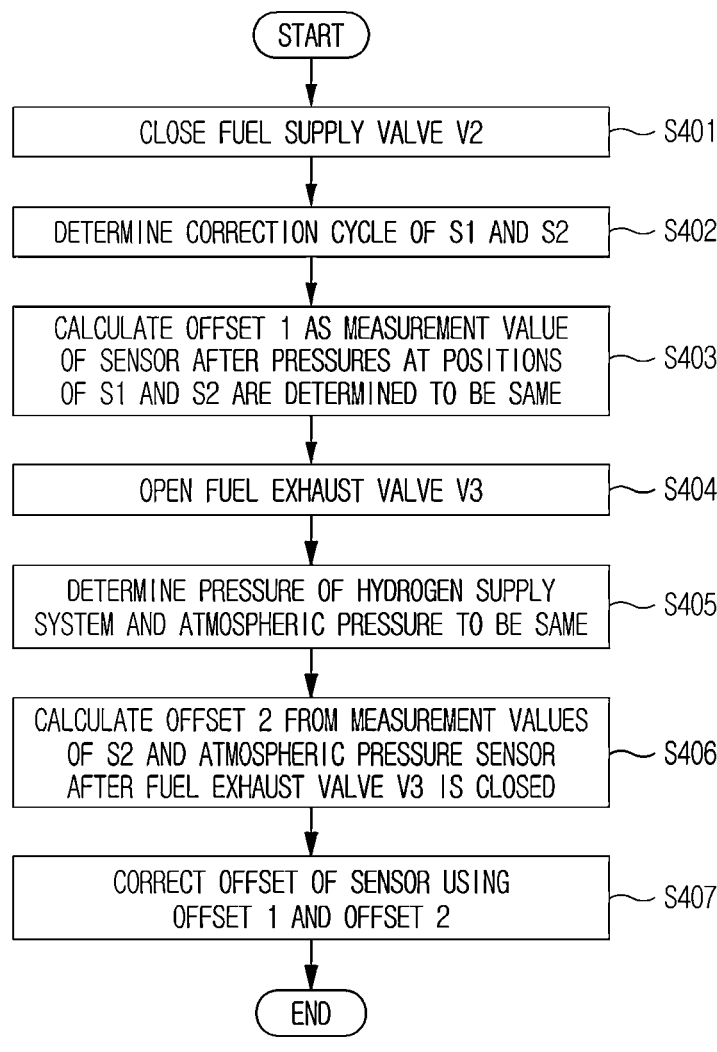
FIG. 4 is a flowchart conceptually showing each operation of a method of correcting an offset of a pressure sensor in a fuel cell system, according to an exemplary embodiment of the present disclosure.

Referring to FIG. 4, in a method of correcting an offset of a pressure sensor in a fuel cell system according to an exemplary embodiment of the present disclosure, the fuel supply valve V2 is closed (S401), and offset correction cycles of the first pressure sensor S1 and the second pressure sensor S2 are determined (S402).

Hereinafter, after the fuel supply valve V2 is closed, whether pressures at each position of the first and second pressure sensors S1 and S2 are equal to each other is checked, and then a first offset offset1 is calculated from a difference between measurement values of the first and second pressure sensors S1 and S2 (S403). Hereinafter, the fuel exhaust valve V3 is opened (S404), and whether pressure of the hydrogen supply system is equal to atmospheric pressure is checked (S405). Hereinafter, after the fuel exhaust valve V3 is closed, a second offset offset2 is calculated from a difference between measurement values of the second pressure sensor S2 and the atmospheric pressure sensor (S406), and finally, offset correction may be performed on the pressure sensors using the first offset offset1 and the second offset offset2 (S407).

Figure 5:
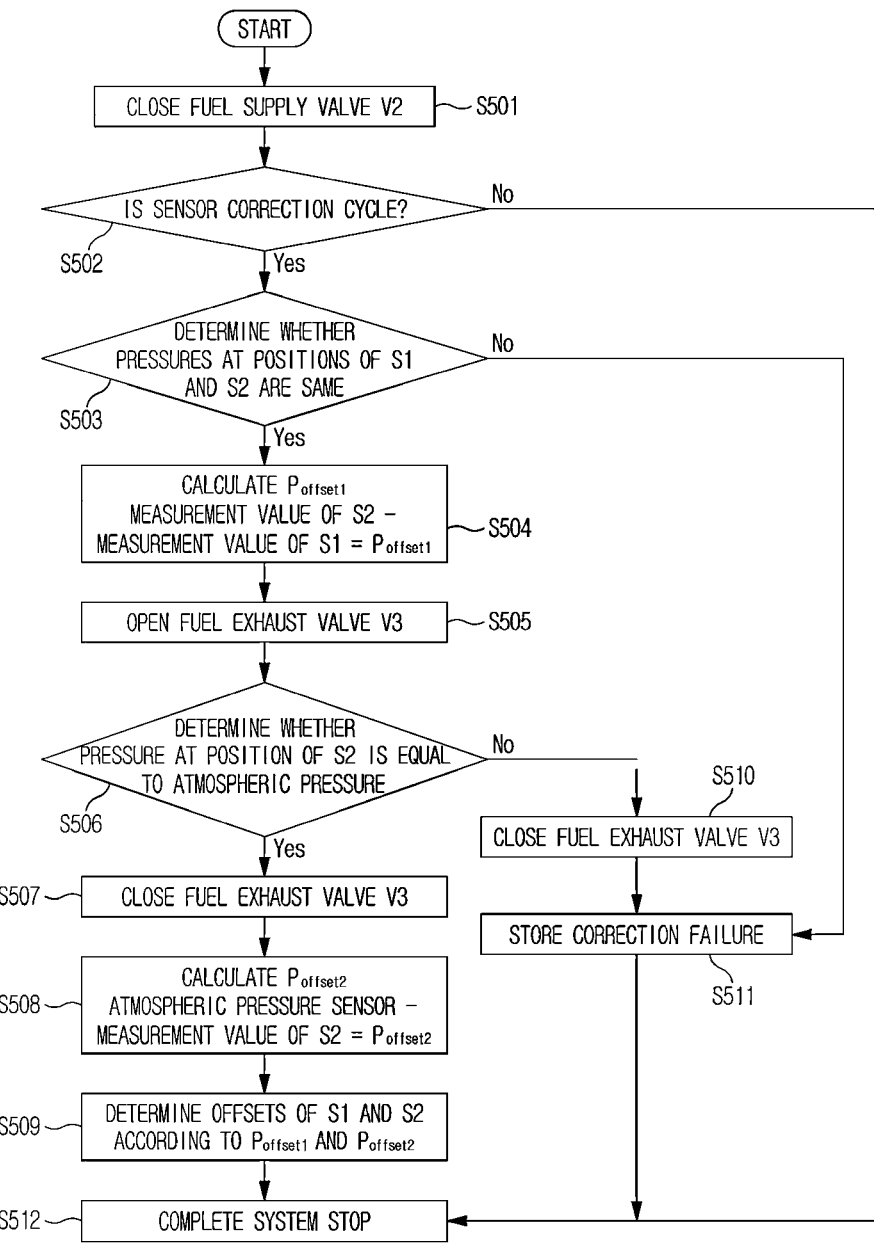
FIG. 5 is a flowchart illustrating detailed operations of a method of correcting an offset of a pressure sensor in a fuel cell system, according to an exemplary embodiment of the present disclosure.
Figure 6:
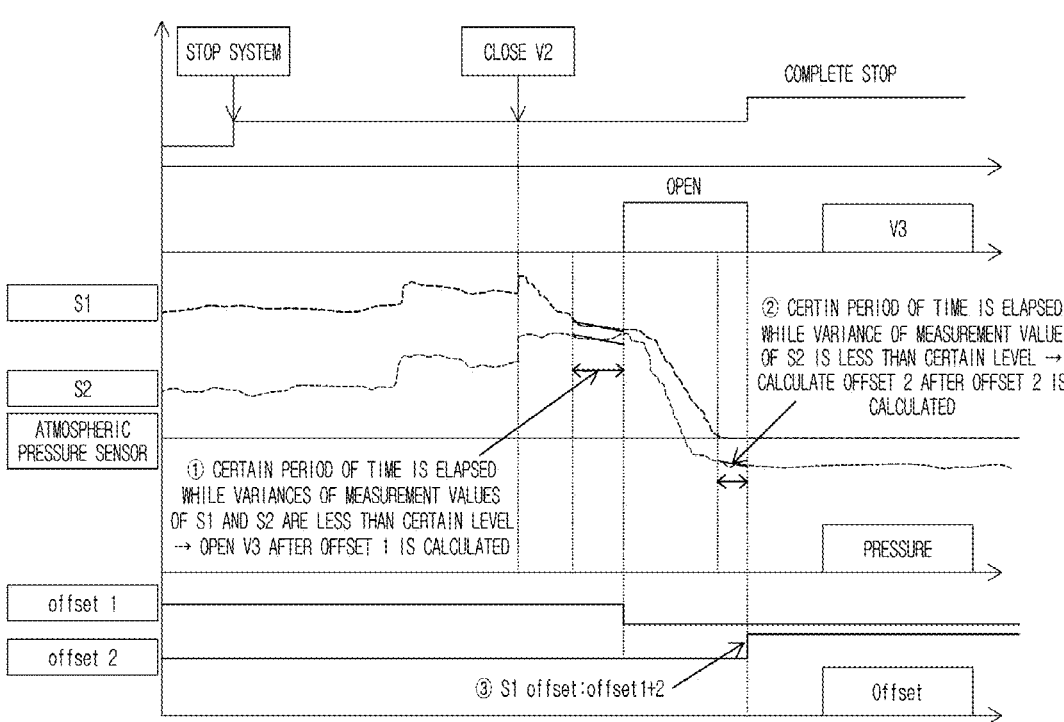
FIG. 6 is a graph illustrating a process in which an offset of a nozzle pressure sensor is corrected in a method of correcting an offset of a pressure sensor in a fuel cell system, according to an exemplary embodiment of the present disclosure.

Next, FIG. 5 illustrates a method of correcting an offset of a pressure sensor in a fuel cell system according to an exemplary embodiment of the present disclosure in more detail, and FIG. 6 illustrates a process in which an offset of the nozzle pressure sensor is corrected accordingly.

Referring to FIG. 5, a method of correcting an offset of a pressure sensor in a fuel cell system according to an exemplary embodiment of the present disclosure is performed while the fuel cell system is stopped, and performed from the closing of the fuel supply valve V2 for system stop, and when pressure sensor correction is completed, finally the system stop may be completed (S512).

Specifically, while the fuel supply valve V2 is closed (S501), whether a sensor correction cycle is reached may be checked by the offset corrector 20 (S502). As a resulting of the checking, when it is determined that the sensor correction cycle is not reached, the system stop is immediately completed without performing operations related to offset correction (S512).

Meanwhile, the sensor correction cycle includes T1 and T2 which are correction cycles of the first pressure sensor S1 (nozzle pressure sensor) and the second pressure sensor S2 (anode pressure sensor), respectively, which are two sensors subjected to the offset correction, that is, two sensors of the hydrogen supply system, and may be stored in the offset corrector 20 in advance.

For example, because the first sensor correction cycle (T1) of the first pressure sensor S1 which is a typical gauge pressure sensor has a greater value than that of the second sensor correction cycle (T2) of the second pressure sensor S2 which is an absolute pressure sensor, operations applied according to the correction cycles of each pressure sensor are applied differently, and thus, the time required to complete the system stop may be shortened. Operations performed for each correction cycle will be described in more detail below.

When a sensor correction cycle is reached, whether pressure at the position of the first pressure sensor S1 and pressure at the position of the second pressure sensor S2 are equal to each other is determined (S503). When it is determined that the pressure at the position of the first pressure sensor S1 and the pressure at the position of the second pressure sensor S2 are equal to each other through operation S503, a first offset Poffset1 is calculated from a difference between a detected pressure value of the first pressure sensor S1 and a detected pressure value of the second pressure sensor S2 (S504).

Next, the fuel exhaust valve V3 is opened (S505), and whether pressure at the position of the second pressure sensor S2 is equal to atmospheric pressure is determined (S506). When the pressure at the position of the second pressure sensor S2 is equal to the atmospheric pressure through operation S506, while the fuel exhaust valve V3 is closed (S507), a second offset Poffset2 is calculated from a difference between a detected pressure value of the atmospheric pressure sensor and a detected pressure value of the second pressure sensor S2 (S508). When the first offset Poffset1 and the second offset Poffset2 are calculated, offsets of the first pressure sensor S1 and the second pressure sensor S2 may each be calculated using the above two values. At this time, an offset with respect to the first pressure sensor S1 may be determined as the sum of the first offset Poffset1 and the second offset Poffset2, and an offset with respect to the second pressure sensor S2 may be determined as the second offset Poffset2 (S509).

In contrast, when it is determined that the pressure at the position of the first pressure sensor S1 and the pressure at the position of the second pressure sensor S2 are not equal to each other in operation S503, a correction failure history is stored (S511) or may be utilized as a condition for diagnosing hydrogen supply system failure. Also, when it is determined that the pressure at the position of the second pressure sensor S2 is not equal to the atmospheric pressure in operation S506, the fuel exhaust valve V3 is closed (S510) to prevent hydrogen from being excessively emitted. Also, when a same pressure condition is not achieved in operation S506, a correction failure history is stored (S511) and may be used to perform a subsequent correction or applied as a condition for diagnosing hydrogen supply system failure.

Meanwhile, referring to FIG. 5, same pressure determination operations in operations S503 and S506 are performed. In this regard, in the determining of whether the pressure at the position of the first pressure sensor S1 and the pressure at the position of the second pressure sensor S2 are equal to each other in the closed state of the fuel supply valve V2 (S503), when a certain first reference period of time set through a test is elapsed, it may be determined that the pressure at the position of the first pressure sensor S1 and the pressure at the position of the second pressure sensor S2 are equal to each other. The first reference period of time may be a value determined from data obtained experimentally for the time required to reach a state in which the pressures at the positions of the first and second pressure sensors S1 and S2 are substantially equal to each other after the fuel supply valve V2 is closed.

Also, in the determining of whether the pressure at the position of the first pressure sensor S1 and the pressure at the position of the second pressure sensor S2 are equal to each other in the closed state of the fuel supply valve V2, when a variance in the detected pressure value of the first pressure sensor S1 and a variance in the detected pressure value of the second pressure sensor S2 each are maintained to be less than a preset threshold variance for a certain second reference period of time, it may be determined that the pressure at the position of the first pressure sensor S1 and the pressure at the position of the second pressure sensor S2 are equal to each other. In this regard, the threshold variance and the second reference period of time are values that are preset in order to be able to determine that a same pressure condition is satisfied, and mean that a change in a detected pressure value is required to be maintained to be less than a certain level for a minimum required period of time.

Also, in the determining of whether the pressure at the position of the second pressure sensor S2 is equal to the atmospheric pressure by opening the fuel exhaust valve V3, when an amount of gas emission from the hydrogen supply system reaches a preset reference value, or when a variance in the detected pressure value of the atmospheric pressure sensor and a variance in the detected pressure value of the second pressure sensor S2 each are maintained to be less than a preset threshold variance for a second reference period of time, it may be determined that the pressure at the position of the second pressure sensor S2 and the atmospheric pressure are equal to each other. For the threshold variance and the second reference period of time, values, which are set to be equal to those in a condition for determining that the pressure at the position of the first pressure sensor S1 and the pressure at the position of the second pressure sensor S2 are equal to each other, are exemplified, but the present disclosure is not limited to having the equal threshold variance and second reference period of time, and the above values may be appropriately changed within a range in which whether to be in a same pressure state may be accurately checked.

Furthermore, in determining of the sensor correction cycle in operation S502, when the first sensor correction cycle (T1) of the first pressure sensor S1 is reached, all of operations S503 to S512 are performed to correct the first pressure sensor S1. In contrast, when it is determined that the second sensor correction cycle (T2) of the second pressure sensor S2 is reached, operations S503 and S504 are skipped and operations after operation S505 are performed to calculate a second offset Poffset2. At this time, the calculated second offset Poffset2 may be applied as a correction value for the second pressure sensor S2.

FIG. 6 is a graph illustrating a process in which an offset of the nozzle pressure sensor is corrected via the method of correcting an offset of a pressure sensor in a fuel cell system as in FIG. 5.

As shown in FIG. 6, when the system is stopped, the fuel supply valve V2 is closed, whether a state in which variances of measurement values of the first pressure sensor S1 and the second pressure sensor S2 are less than a certain level is maintained while a certain period of time is elapsed is determined as in a mark "①", and when the corresponding condition is satisfied, a difference between a measurement value of the second pressure sensor S2 and a measurement value of the first pressure sensor S1 may be set as a first offset offset1. Hereinafter, the fuel exhaust valve V3 is switched to an open state, and accordingly, a pressure on the anode 11 side is decreased to an atmospheric pressure level. As indicated in a box of "②", when a state in which a variance of a measurement value of the second pressure sensor S2 is less than a certain level is maintained while a certain period of time is elapsed, the fuel exhaust valve V3 is closed again, and then a second offset offset2 is calculated from a difference between measurement values of the atmospheric pressure sensor and the second pressure sensor S2.

The bottom of the graph of FIG. 6 shows the first offset offset1 and the second offset offset2, and as in ③, an offset of the first pressure sensor S1 is processed by the sum of the first offset offset1 and the second offset offset2, and an offset of the second pressure sensor S2 is processed as the second offset offset2.

Although shown and described with respect to specific embodiments of the present disclosure, it will be apparent to those of ordinary skill in the art that the present disclosure can be variously improved and changed without departing from the technical spirit of the present disclosure provided by the following claims.

DESCRIPTION OF REFERENCE NUMERALS

10: fuel cell stack
11: anode 12: cathode
13: ejector 14: water trap
20: offset corrector
V1: fuel cut-off valve
V2: fuel supply valve
V3: fuel exhaust valve
S1: first pressure sensor
S2: second pressure sensor

What is claimed is:

1. A method of correcting an offset of a pressure sensor in a fuel cell system comprising a first pressure sensor and a second pressure sensor, which are installed between a rear end of a fuel supply valve of a hydrogen supply system and an anode inlet, the method comprising: determining whether pressure at a position of the first pressure sensor and pressure at a position of the second pressure sensor are equal to each other in a closed state of the fuel supply valve; when determined to be an equal pressure to each other, calculating a first offset from a difference between a detected pressure value of the first pressure sensor and a detected pressure value of the second pressure sensor; determining whether the pressure at the position of the second pressure sensor is equal to atmospheric pressure by opening a fuel exhaust valve; when determined that the pressure at the position of the second pressure sensor is equal to the atmospheric pressure, calculating a second offset from a difference between a detected pressure value of an atmospheric pressure sensor and a detected pressure value of the second pressure sensor in a state in which the fuel exhaust valve is closed; and correcting offsets of the first pressure sensor and the second pressure sensor using the first offset and the second offset wherein the first pressure sensor is a gauge pressure sensor, and the second pressure sensor is an absolute pressure sensor, and wherein the first pressure sensor is a nozzle pressure sensor located between the fuel supply valve and an ejector, and the second pressure sensor is an anode pressure sensor located between a rear end of the ejector and the anode inlet.

2. The method of claim 1, wherein, in the correcting offsets of the first pressure sensor and the second pressure sensor, an offset with respect to the first pressure sensor is determined as a sum of the first offset and the second offset, and an offset with respect to the second pressure sensor is determined as the second offset.

3. The method of claim 1, wherein, in the determining whether pressure at a position of the first pressure sensor and pressure at a position of the second pressure sensor are equal to each other in a closed state of the fuel supply valve, when a preset first reference period of time has elapsed, the pressure at the position of the first pressure sensor and the pressure at the position of the second pressure sensor are determined to be equal to each other.

4. The method of claim 1, wherein, in the determining whether pressure at a position of the first pressure sensor and pressure at a position of the second pressure sensor are equal to each other in a closed state of the fuel supply valve, when a variance in the detected pressure value of the first pressure sensor and a variance in the detected pressure value of the second pressure sensor each are maintained to be less than a preset threshold variance for a second reference period of time, the pressure at the position of the first pressure sensor and the pressure at the position of the second pressure sensor are determined to be equal to each other.

5. The method of claim 1, wherein, in the determining whether the pressure at the position of the second pressure sensor is equal to atmospheric pressure by opening a fuel exhaust valve, when an amount of gas emission from the hydrogen supply system reaches a preset reference value, the pressure at the position of the second pressure sensor and the atmospheric pressure are determined to be equal to each other.

6. The method of claim 1, wherein, in the determining whether the pressure at the position of the second pressure sensor is equal to atmospheric pressure by opening a fuel exhaust valve, when a variance in the detected pressure value of the atmospheric pressure sensor and a variance in the detected pressure value of the second pressure sensor each are maintained to be less than a preset threshold variance for a second reference period of time, the pressure at the position of the second pressure sensor and the atmospheric pressure are determined to be equal to each other.

7. The method of claim 1, wherein a first sensor correction cycle (T1) for the first pressure sensor and a second sensor correction cycle (T2) for the second pressure sensor are predetermined and stored in an offset corrector, and
the method further comprises, prior to the determining whether pressure at a position of the first pressure sensor and pressure at a position of the second pressure sensor are equal to each other in a closed state of the fuel supply valve, checking, by the offset corrector, whether the first sensor correction cycle (T1) or the second sensor correction cycle (T2) is reached.

8. The method of claim 7, wherein, when the first sensor correction cycle (T1) is reached, an offset of the first pressure sensor is corrected by a sum of the first offset and the second offset calculated by performing operations performed after the determining whether pressure at a position of the first pressure sensor and pressure at a position of the second pressure sensor are equal to each other in a closed state of the fuel supply valve.

9. The method of claim 7, wherein, when the second sensor correction cycle (T2) is reached, the calculating a first offset is skipped and only operations performed after the determining whether the pressure at the position of the second pressure sensor is equal to atmospheric pressure by opening a fuel exhaust valve are performed, and an offset of the second pressure sensor is corrected by the calculated second offset.

10. An apparatus for correcting an offset of a pressure sensor in a fuel cell system comprising a first pressure sensor and a second pressure sensor, which are installed between a rear end of a fuel supply valve of a hydrogen supply system and an anode inlet, the apparatus comprising an offset corrector for correcting an offset with respect to the first pressure sensor and an offset with respect to the second pressure sensor, wherein the offset corrector is configured to:

when pressure at a position of the first pressure sensor and pressure at a position of the second pressure sensor are equal to each other in a closed state of the fuel supply valve, calculate a first offset from a difference between a detected pressure value of the first pressure sensor and a detected pressure value of the second pressure sensor, when the pressure at the position of the second pressure sensor is equal to atmospheric pressure by opening a fuel exhaust valve connected on an exhaust side, calculate a second offset from a difference between a detected pressure value of an atmospheric pressure sensor and a detected pressure value of the second pressure sensor in a state in which the fuel exhaust valve is closed, and correct offsets of the first pressure sensor and the second pressure sensor using the calculated first and second offsets, wherein the first pressure sensor is a gauge pressure sensor, and the second pressure sensor is an absolute pressure sensor, and wherein the first pressure sensor is a nozzle pressure sensor located between the fuel supply valve and an ejector, and the second pressure sensor is an anode pressure sensor located between a rear end of the ejector and the anode inlet.

11. The apparatus of claim 10, wherein the offset corrector determines a sum of the first offset and the second offset as the offset with respect to the first pressure sensor, and determines the second offset as the offset with respect to the second pressure sensor.

12. The apparatus of claim 10, wherein the offset corrector determines that the pressure at the position of the first pressure sensor and the pressure at the position of the second pressure sensor are equal to each other when a preset first reference period of time has elapsed in the closed state of the fuel supply valve.

13. The apparatus of claim 10, wherein the offset corrector determines that the pressure at the position of the first pressure sensor and the pressure at the position of the second pressure sensor are equal to each other when a variance in the detected pressure value of the first pressure sensor and a variance in the detected pressure value of the second pressure sensor each are maintained to be less than a preset threshold variance for a second reference period of time.

14. The apparatus of claim 10, wherein the offset corrector determines that the pressure at the position of the second pressure sensor is equal to the atmospheric pressure when an amount of gas emission from the hydrogen supply system reaches a preset reference value after the fuel exhaust valve is opened.

15. The apparatus of claim 10, wherein the offset corrector determines that the pressure at the position of the second pressure sensor is equal to the atmospheric pressure when a variance of the detected pressure value of the atmospheric pressure sensor and a variance of the detected pressure value of the second pressure sensor each are maintained to be less than a preset threshold variance for a second reference period of time.

16. The apparatus of claim 11, wherein the offset corrector stores information on a first sensor correction cycle (T1) for the first pressure sensor and a second sensor correction cycle (T2) for the second pressure sensor, the offset corrector checks whether the first sensor correction cycle (T1) or the second sensor correction cycle (T2) is reached, when the first sensor correction cycle (T1) is reached, the offset corrector corrects the offset of the first pressure sensor by the calculated sum of the first offset and the second offset, and when the second sensor correction cycle (T2) is reached, the offset corrector corrects the offset of the second pressure sensor by the calculated second offset.

\* \* \* \* \*